(12) United States Patent
Waldorf

(10) Patent No.: US 7,987,234 B1
(45) Date of Patent: Jul. 26, 2011

(54) MONITORING ALERT CONDITIONS

(75) Inventor: Jerry A. Waldorf, Woodland Hills, CA (US)

(73) Assignee: Oracle America, Inc., Redwood City, CA (US)

( * ) Notice: Subject to any disclaimer, the term of this patent is extended or adjusted under 35 U.S.C. 154(b) by 1025 days.

(21) Appl. No.: 11/250,966

(22) Filed: Oct. 14, 2005

Related U.S. Application Data

(60) Provisional application No. 60/619,076, filed on Oct. 14, 2004, provisional application No. 60/619,111, filed on Oct. 15, 2004.

(51) Int. Cl.
*G06F 15/16* (2006.01)
*G06F 3/00* (2006.01)
*G06F 3/048* (2006.01)
*G06F 7/00* (2006.01)

(52) U.S. Cl. ........ 709/206; 709/204; 715/762; 715/763; 707/722

(58) Field of Classification Search .................... 709/206
See application file for complete search history.

(56) References Cited

U.S. PATENT DOCUMENTS

| | | | |
|---|---|---|---|
| 5,199,439 A | 4/1993 | Zimmerman et al. | |
| 5,241,461 A | 8/1993 | Georges | |
| 5,428,776 A * | 6/1995 | Rothfield | 707/4 |
| 5,564,433 A | 10/1996 | Thornton | |
| 5,844,572 A | 12/1998 | Schott | |
| 6,356,917 B1 * | 3/2002 | Dempsey et al. | 707/202 |
| 6,658,404 B1 * | 12/2003 | Cecchini | 707/3 |
| 7,076,695 B2 | 7/2006 | McGee et al. | |
| 2002/0138472 A1 * | 9/2002 | Ricciardi | 707/3 |
| 2003/0009313 A1 * | 1/2003 | May et al. | 702/188 |
| 2003/0056199 A1 | 3/2003 | Li et al. | |
| 2003/0079160 A1 | 4/2003 | McGee et al. | |
| 2003/0110007 A1 | 6/2003 | McGee et al. | |
| 2003/0110103 A1 * | 6/2003 | Sesek et al. | 705/28 |
| 2003/0164762 A1 | 9/2003 | Ridley | |
| 2003/0195880 A1 * | 10/2003 | Mancinelli | 707/4 |
| 2004/0064351 A1 | 4/2004 | Mikurak | |
| 2005/0004911 A1 * | 1/2005 | Goldberg et al. | 707/7 |
| 2005/0065941 A1 * | 3/2005 | DeAngelis et al. | 707/100 |
| 2005/0102426 A1 * | 5/2005 | Hamm et al. | 709/243 |
| 2005/0256752 A1 * | 11/2005 | Ramachandran et al. | 705/7 |
| 2006/0028471 A1 | 2/2006 | Kincaid et al. | |
| 2006/0059253 A1 | 3/2006 | Goodman et al. | |
| 2006/0178918 A1 | 8/2006 | Mikurak | |
| 2007/0038756 A1 | 2/2007 | Waldorf et al. | |

OTHER PUBLICATIONS

U.S. Appl. No. 11/251,652, filed Oct. 14, 2005, Final Office Action, Mailing Date Sep. 19, 2008.
U.S. Appl. No. 11/251,652, filed Oct. 14, 2005, Office Action, Mailing Date Nov. 21, 2008.
U.S. Appl. No. 11/251,652, filed Oct. 14, 2005.

* cited by examiner

*Primary Examiner* — Kenny S Lin
*Assistant Examiner* — Jasmine Myers
(74) *Attorney, Agent, or Firm* — Osha • Liang LLP

(57) ABSTRACT

Graphical means for setting up, monitoring and issuing alerts for data conditions are described.

18 Claims, 13 Drawing Sheets

| 645 | | Validate checks the syntactical validity of the SQL code listing and reports success or any errors found. |
|---|---|---|

FIG. 6C

| 650 | | Undo and Redo allow you travel backward and forward through the sequence of modifications you have made to the graphical canvas. |
|---|---|---|
| 655 | | |
| 660 | | Validate checks the syntactical validity of the graph and, in the Output pane, reports success or any errors found, highlighting all operators that are unsatisfied. |
| 665 | | Show SQL for Condition tries to validate the graph and, if successful, displays the corresponding SQL statement for the entire condition.<br>In the Output pane, you can specify which "flavor" of SQL to display, of: Oracle8, Oracle9, SQL Server, Internal, or ANSI92. |
| 670 | | Expand All Graph Icons provides more detail, by showing all input to (and output from) all fields in all operators on the canvas. |
| 675 | | Collapse All Graph Icons provides more screen space by minimizing all operators, showing only the connections to and from them. |
| 680 | | Autolayout All Graph Icons disentangles crossed connections and overlaps, and creates left-to-right flow of input to output. |
| 685 | | Print Graph allows you to print the graph, using various scaling options. |

FIG. 6D

MONITORING ALERT CONDITIONS

RELATED APPLICATIONS

This application claims the benefit of priority to U.S. Patent Application No. 60/619,076, filed Oct. 14, 2004, and U.S. Patent Application No. 60/619,111, filed Oct. 15, 2004. The disclosures of the prior applications are considered part of and are incorporated by reference in the disclosure of this application.

BACKGROUND

This application is related to computer systems for processing information. Computer systems and their associated applications have advanced our ability to compute and transform data and thereby provide meaningful information about data that has been accumulated. We can also use applications to monitor processes as they occur, that is, in real time, and provide valuable information while data is being accumulated rather than waiting until after the data has been collected. Alerts can be provided in response to collected data. One example of an alert is performed by an electronic messaging application. When the messaging application detects that a message has been received, the application notifies the user about the message that has been received, such as by playing a sound, displaying a representation of the message or by automatically generating an electronic message. The user can then retrieve the message. Because of the alert, the user need not continuously check whether new messages have arrived.

SUMMARY

Techniques are described for creating alerts, where a user can input alert conditions using graphical means. The user is not required to write any code to create the alert conditions.

In one aspect, the invention is directed to a method of providing a user with a programmable alerting application. A user interface having a representation of a data element is provided. A representation of an operator is provided. A canvas where the representation of the data element is associated with the representation of an operator is also provided. Whether a condition for an alert has occurred is determinable according to a result achieved when the operator is applied to the data element.

Implementations of the invention can include one or more of the following features. The representation of the operator can include a representation of SQL code, which can be displayed. A representation of a dataset view can be provided, wherein fields in the representation of a dataset view determine information to be conveyed in the alert and each field is an output of the data element in combination with an operator. User input can be received that determines an alert interval, an alert resend frequency or an address (e.g., e-mail) for sending the alert. The representation of the operator can include an icon.

In another aspect, the invention is directed to a method of sending alert conditions. Data element input is received from a user, the data element input representing data the user wants monitored. An operator selection is received from the user, wherein the user selects a graphical user interface component representing the operator. Instructions to associate the data element with the operator are received. The data element is monitored, including applying the operator to the data element to determine whether a condition has occurred. If the condition has occurred, an alert is sent. Optionally, the data element represents data in a database. Sending the alert can include performing an operation on the data the user wants monitored and presenting a result of the operation In yet another implementation, the invention is directed to a method of providing a user with an alert application. An indication of a location of data is received from a user. A selection of SQL operations to perform on the data is received from the user, wherein the selection is received from the user in a graphical format other than SQL code. An alert application is created based on the data from the indicated location and the one or more SQL operations.

In another implementation, the invention is directed to a system for creating an alert. The system includes a condition editor engine, an operator editor engine and a notification engine. The condition editor engine accepts conditions from a user, the conditions indicating data that is to be monitored, wherein the user selects graphical representations of the conditions rather than writing coded conditions. The operator editor engine accepts operators from the user, the operators being performed on the data to produce a result, wherein the result determines whether a condition has occurred. The notification engine notifies when the condition has occurred.

Embodiments of the invention may include none, one or more of the following features. A user can be provided with a graphical means for setting up an alert. The means can include icons, check boxes or other graphical components. The graphical components can represent an operation, such as a SQL based operation, that can be performed on data. Because the graphical components are provided, the user need not enter code to set up the alert. This can prevent mistakes or make setting up and alert available to users who are not conversant in the required SQL code.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 6C and 6D show tool palettes.

Like reference symbols in the various drawings indicate like elements.

DETAILED DESCRIPTION

An Integrated Composite Application Network (ICAN) Suite is provided to allow enterprises to rapidly provide configurable and automated business process flows. The ICAN Suite assembles the functionality in existing applications and systems and delivers a fully distributed, centrally managed solution for the rapid assembly, deployment, and management of enterprise-scale, end-user applications. In one implementation, the ICAN Suite provides a completely open, standards-based, service-oriented architecture that includes a fully J2EE-certified, portable, integrated composite application network. The ICAN Suite enables the creation of composite applications including enterprise-scale, interactive, end-user applications that span multiple, cross-organizational business processes to connect all necessary people, systems, and devices. The ICAN Suite allows business users, as well as developers, to easily create interactive applications that call on available business processes and Web services, packaging pages together as a coordinated composite application. An ICAN Suite is available from SeeBeyond, Inc.

Figure 1A:
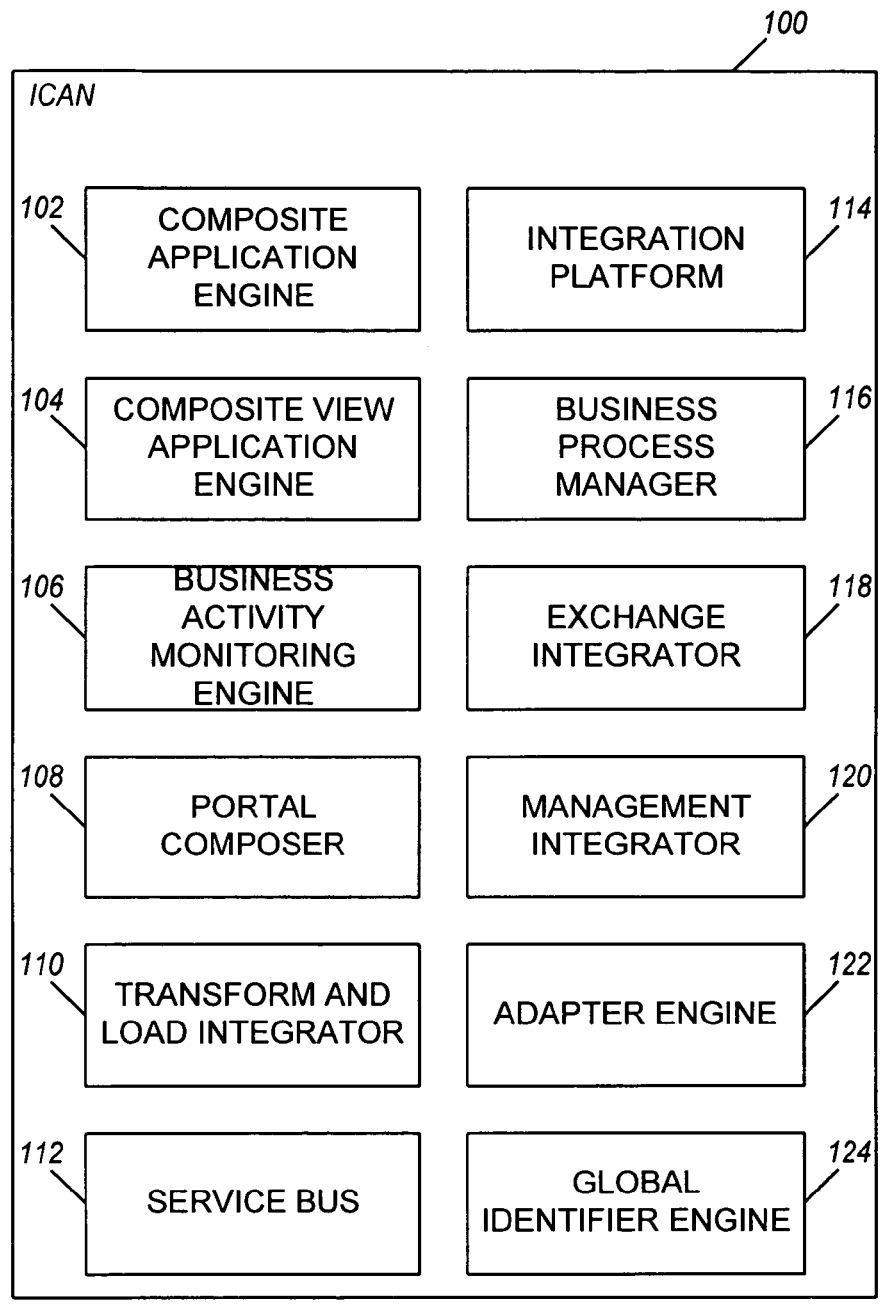
FIG. 1A is a block diagram of an Integrated Composite Application Network Suite.

As shown in FIG. 1A, in one implementation, the ICAN Suite 100 includes twelve core engines including a composite application engine 102, a composite view application engine 104, a business activity monitoring engine 106, a portal composer 108, a transform and load integrator 110, a service bus 112, an integration platform 114, a business process manager 116, an exchange integrator 118, a management integrator 120, an adaptor engine 122, and global identifier engine 124.

The composite application engine (referred to as eVision Studio) 102 enables the rapid design and generation of interactive Web and wireless composite applications (in one implementation, without any programming), creating end-user business interfaces that overlay composite applications and workflow management.

The composite view application engine (referred to as eView Studio) 104 enables the rapid design and generation of "single-view" composite applications for cleansing, matching, and indexing user-defined business objects, such as customers, businesses, or products, that are not uniquely identified across all enterprise systems.

The business activity monitoring engine (referred to as eBAM Studio) 106 is a tool for rapidly designing and generating BAM composite applications (in one implementation, without any programming), consisting of real-time alerts, graphical dashboards and reports, and key performance indicators (KPI) defined by business users.

The portal composer (referred to as ePortal Composer) 108 is a full-featured portal generation tool providing aggregation of any Web-based channel with content personalization and administration services.

The transform and load integrator (referred to as the eTL Integrator) 110 provides Extract, Transform, and Load (ETL) functionality optimized for very large record set and bulk data transformation and movement scenarios, fully integrated with the rest of the business integration suite.

The service bus (referred to as the eInsight Enterprise Service Bus) 112 provides coordination for enterprise Web services.

The integration platform (referred to as eGate Integrator) 114 provides a Web services and J2EE-based integration platform.

The business process manager (referred to as eInsight Business Process Manager (BPM)) 116 is an open and Web services-based BPM solution.

The exchange integrator (referred to as eXchange Integrator) 118 provides a solution for defining trading partner profiles and protocol management for B2B interoperability.

The management integrator (referred to as eXpressway Integrator) 120 provides enhanced management capabilities for streamlined distribution, configuration, and management of the various ICAN Suite engines and services.

The adapter engine (referred to as eWay Intelligent Adapter) 122 provides a line of pre-built adapters for common applications and datastores, and in one implementation is enhanced to support JCA as well as expose applications as Web services.

The global identifier engine (referred to as eIndex Global Identifier) 124 provides an indexing solution enhanced for Web-based access and user configuration of matching criteria.

The business activity monitoring engine (referred to as eBAM Studio) 106 is a tool for rapidly designing and generating business activity monitoring (BAM) composite applications. In one implementation, BAM composite applications are designed and generated without any programming. A BAM composite application that is designed and generated using the business activity monitoring engine 106 can intercept the flow of data through the ICAN suite 100. Based on the intercepted data, the BAM composite application can produce real-time alerts, graphical dashboards and reports, and display key performance indicators (KPI) defined by users.

Figure 1B:
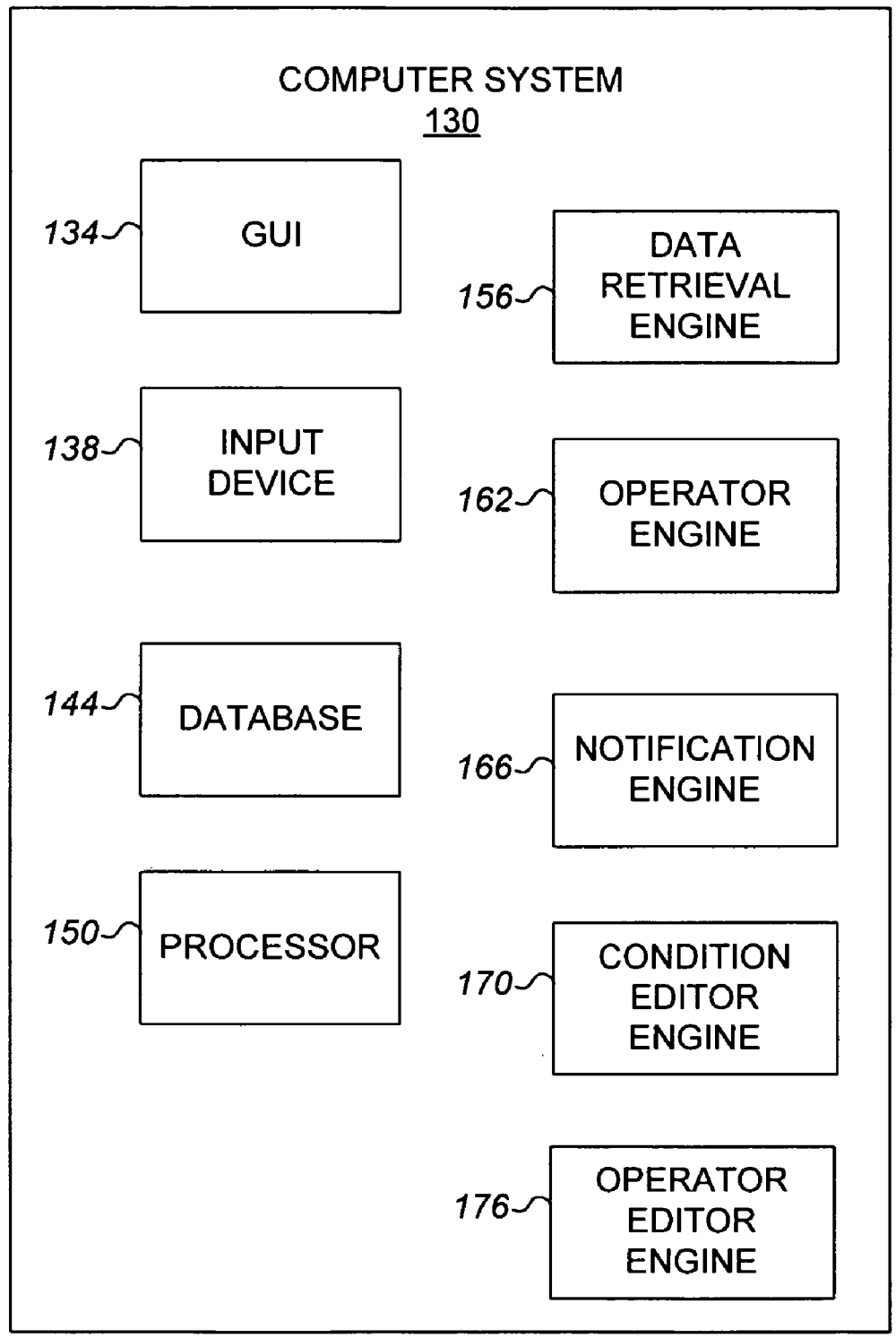
FIG. 1B is a block diagram of a computer system.

Referring to FIG. 1B, a computer system 130 is provided for a user to create an alert application. The computer system 130 includes a graphical user interface (GUI) 134 for displaying information to the user. The user can enter input into the computer system 130 using an input device 138. A database 144 stores information, such as data, data definitions, records, and alert applications. A processor 150 processes data for the alert application.

The computer system 130 also includes a data retrieval engine 156, an operator engine 162 and a notification engine 166. The data retrieval engine 156 retrieves stored data in the database 144 (or other storage medium, such as a queue or other storage for data), such as information about transactions. The operator engine 162 performs operations, as indicated by an alert application, on the retrieved data. The notification engine 166 sends an alert, such as an e-mail, according to instructions in an alert application. A condition editor engine 170 allows a user to edit conditions on data, e.g., to input what data is to be monitored. An operator editor engine 176 allows a user to edit operators on data, that is, to input when an alert will be sent.

Figure 2:
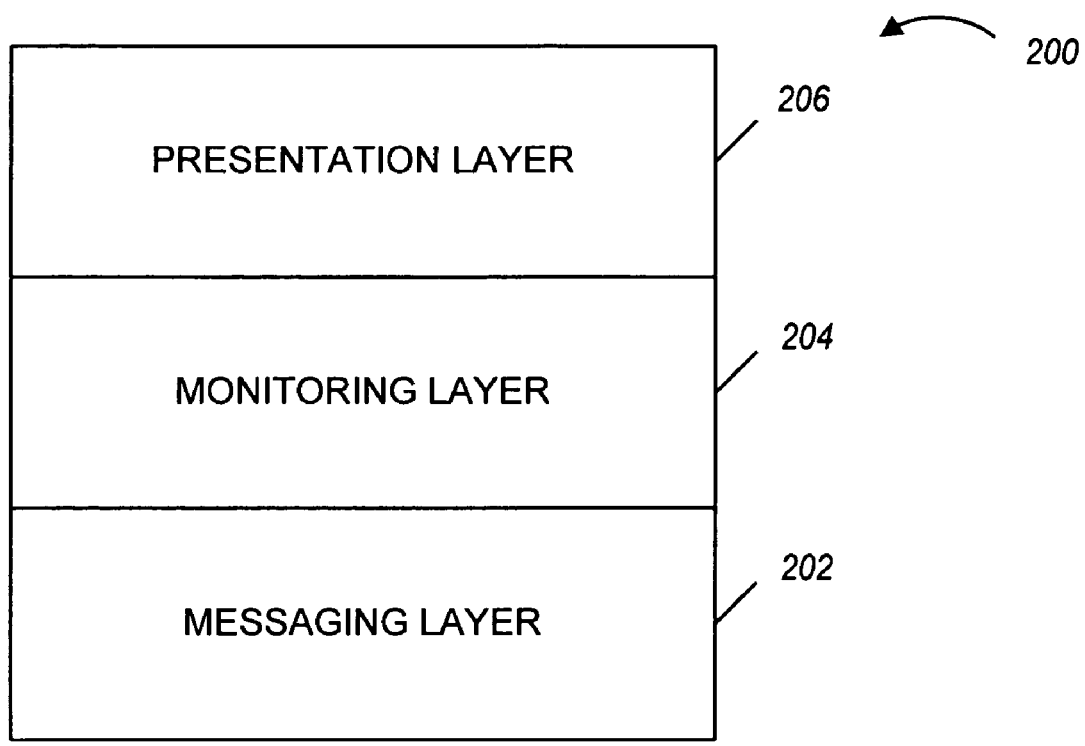
FIG. 2 is a block diagram showing an architecture of a business activity monitoring composite application.

Referring to FIG. 2, an architecture of a BAM composite application 200, such as an alert application, according to one implementation can include three layers—a messaging layer 202, a monitoring layer 204, and a presentation layer 206. The messaging layer 202 can communicate with external systems to intercept data from the ICAN suite processes. The monitoring layer 204 can track data that is of interest to users. The monitored data can be used to generate and pass upward to the presentation layer 206 real-time alerts, reports, and key performance indicators (KPI) that users find meaningful. The presentation layer 206 can provide a front-end GUI that allows users to see the real-time alerts, reports, and key performance indicators (KPI).

In creating an alert application, the business activity monitoring engine 106, through its GUI, allows users to define the real-time alerts, reports, and key performance indicators (KPI) that are of interest to the users.

Figure 3:
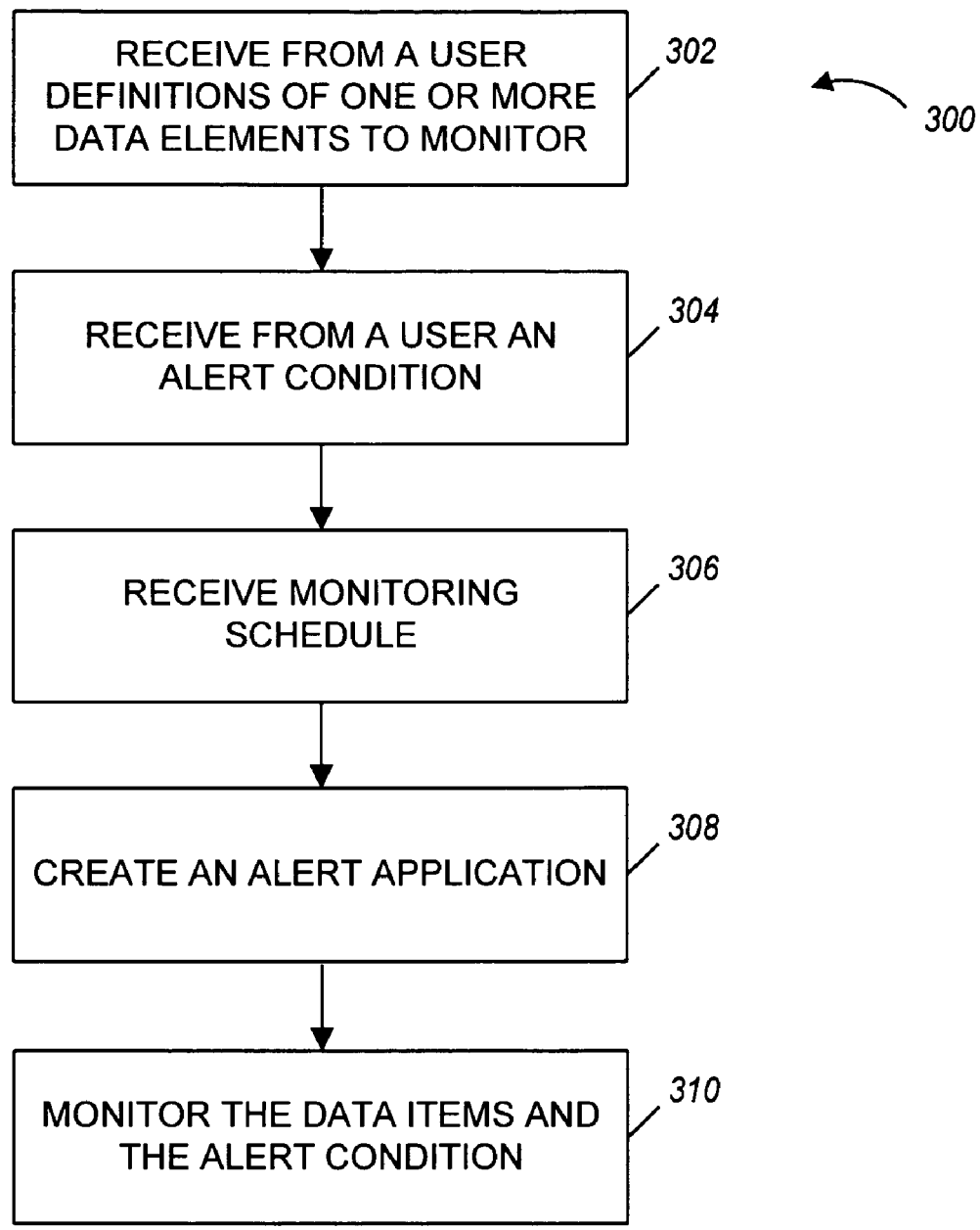
FIG. 3 is a flowchart illustrating a process for creating a business activity monitoring composite application to monitor alerts.

The BAM engine creates an alert application after receiving user input that determines what data is to be monitored and how to process the monitored data. Referring to FIG. 3, the business activity monitoring engine 106 can receive, from a user, definitions of one or more data elements to monitor (step 302). A definition of a data element can include, for example, a name of the data element, a data type of the data element (e.g., character, integer, and so on), a default value of the data element, and so on.

The business activity monitoring engine 106 can further receive from the user a set of one or more alert conditions (step 304). An alert condition specifies a state of monitored data elements that can lead to an alert. A user can define an alert condition (or what could be referred to as a pre-alert condition) such that the alert condition, if met, does not trigger an alert but indicates that an alert will be triggered in the future. Consequently, users can define alert conditions that will/may allow the users to watch for the early warning signs of alerts and spot the alerts before the alerts are triggered. An alert condition can be as simple as a particular monitored data element exceeding a user-defined threshold. Alternatively, an alert condition can include elaborate calculations (e.g., a complex comparison between ratios of many aggregates of monitored data elements).

In one implementation, the user is able to input the alert condition using a GUI component, such as an icon or display with boxes that can be checked. The GUI component corresponds to commands in a language that is capable of accessing a database, such as native Structured Query Language (SQL) commands. When the component is selected, the corresponding SQL command is performed on the data element. SQL herein can be any SQL language, such as Oracle8, Oracle9, SQL Server, internal SQL or ANSI92.

In defining an alert application, a user can further specify and the system can receive a monitoring schedule (step 306). A monitoring schedule associated with an alert condition specifies how often an alert application needs to monitor the alert condition (i.e., check whether the alert condition has been met).

Once the business activity monitoring engine 106 receives, from a user, definitions of one or more data elements to monitor and a set of one or more alert conditions, the business activity monitoring engine 106 can create an alert application to monitor data elements and alert conditions specified by the user (step 308). The data elements and the alert condition are monitored (step 310). At some time, if an alert condition is met, the alert application can take actions according to an alert condition business process associated with the alert condition.

In defining an alert condition, a user can further specify an alert condition business process. An alert condition business process associated with an alert condition defines actions for an alert application to take when the alert condition is met. For instance, an alert condition business process can define notification information that an alert application needs to communicate when an alert condition is met. An alert condition business process can further define a method for communicating notification information. In one implementation, a user can specify an alert condition business process such that once an alert condition is met, an alert application can simply communicate, such as in an e-mail message, that the alert condition was met. Alternatively, a user can specify an alert condition business process such that when an alert condition is met, a BAM application can interact with other applications and processes (e.g., using a Web Service interface) to propagate notification information and/or to take corrective action. The application can be stored in database 144. Once the application has been started, the data retrieval engine 156 retrieves, that is monitors, the data associated with the data elements. The operator engine 162 performs specified operations on the data. When a condition is met according to the user input, the notification engine 166 sends a notification.

Specific examples of techniques that can be made available for allowing a user to input the data elements to be monitored and the conditions that cause an alert to be issued are described below.

Data Definitions

In one implementation, the user can input the definition of the data elements to be monitored into the computer system 130 using the following steps. The user creates a data definition, which specifies the data the user is interested in monitoring. The user can also determine how to label and organize the data. The data definition includes one or more data elements. The user can define a type for each data element.

Figure 4:
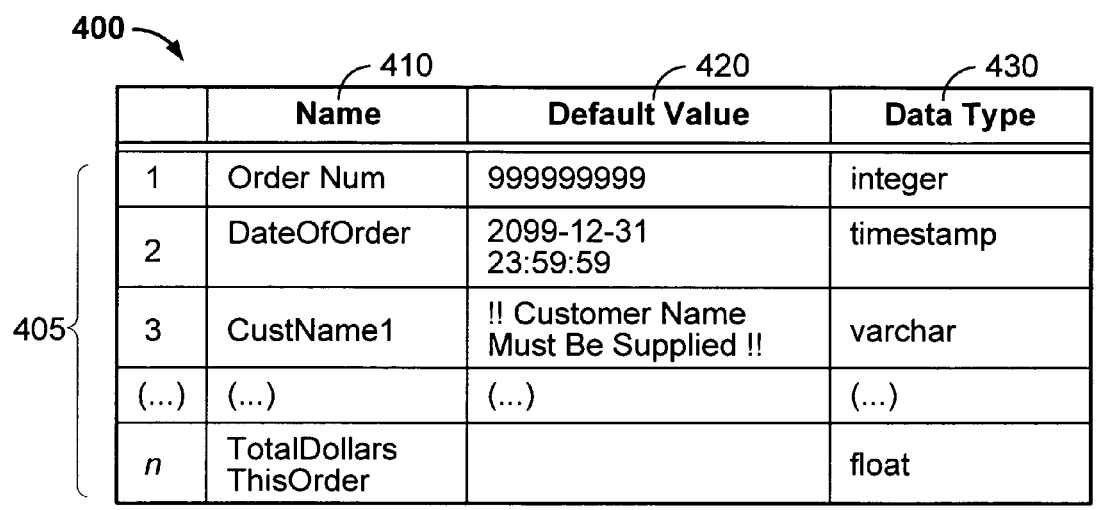
FIG. 4 is an example of a data definition.

In one implementation, a data definition includes data elements, each element having a name, a value, and a type. Referring to FIG. 4, data definition 400 includes data elements 405, each data element having a name 410, a default value 420 and a type 430. A unique name 410 is used to identify the element when selecting a condition for the element. The default value 420 can be specified, and can be null in some instances. The data element type 430 can be one of a fixed length character (char), floating point number data (float), an integer, a timestamp or a variable length character (varchar). Other data types can also be used, as known to one of skill in the art. In some implementations, the data definition will include a data retention value, which indicates how long data should be retained before being purged.

Figure 5:
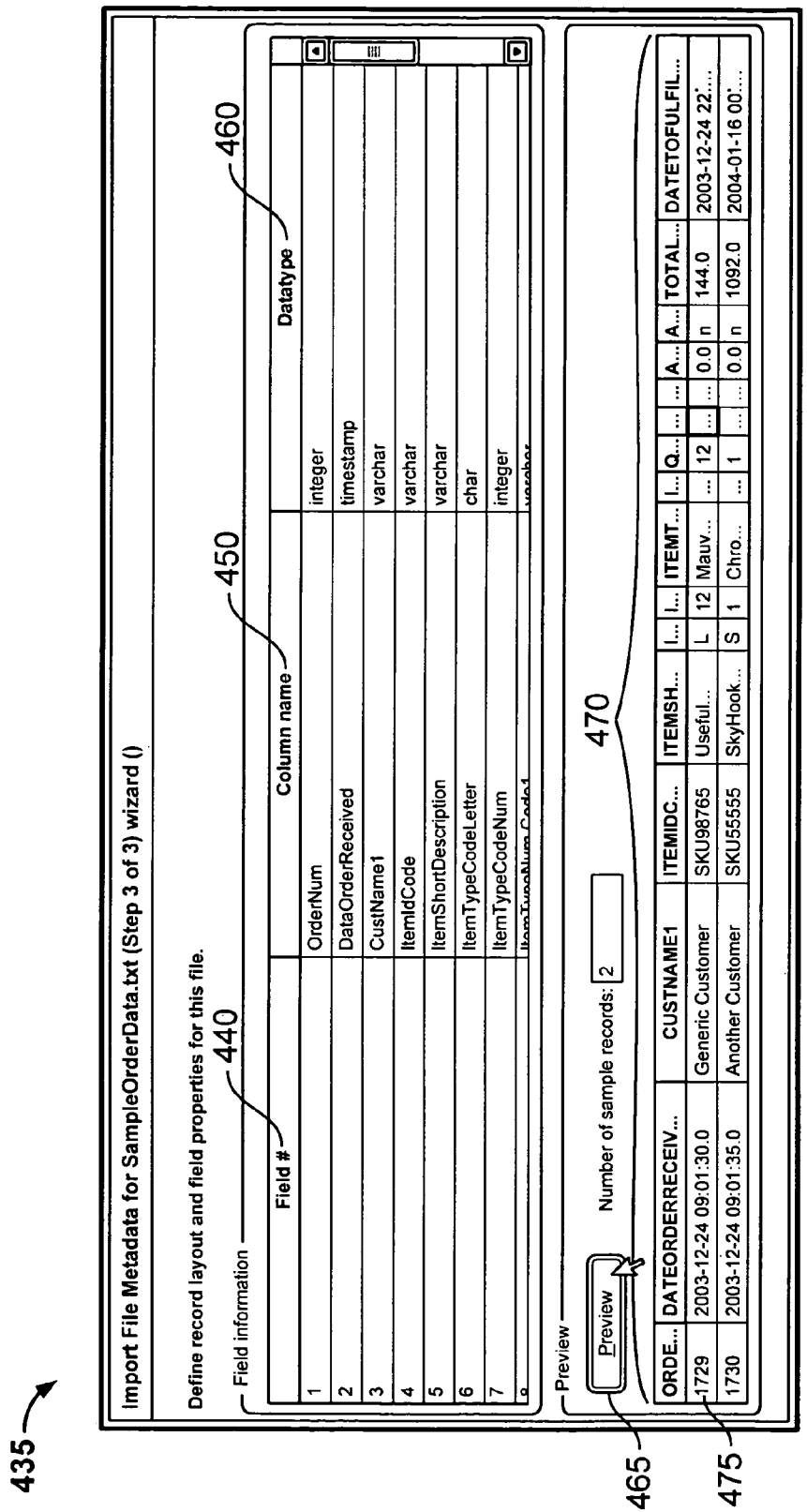
FIG. 5 is a GUI of a data definition with resulting records.

Referring to FIG. 5, an example of a GUI 435 for a data definition includes a field 440 for the data element, the names 450 and the data type 460. A preview 465 portion of the GUI can show the results that are retrieved from database 144 based on the data definition. Each column 470 in the preview 465 represents the data element that was selected for the data definition 400. The rows represent the results 475 of the data retrieval.

Conditions

Figure 6A:
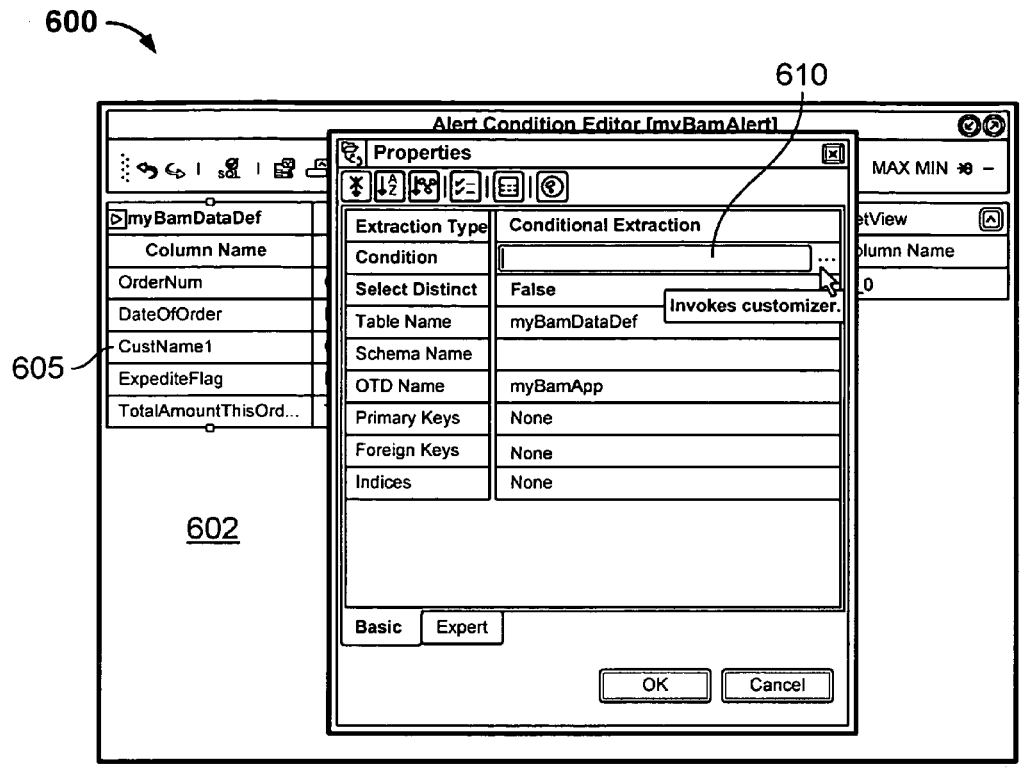
FIG. 6A is a GUI of a display for setting a condition.
Figure 6B:
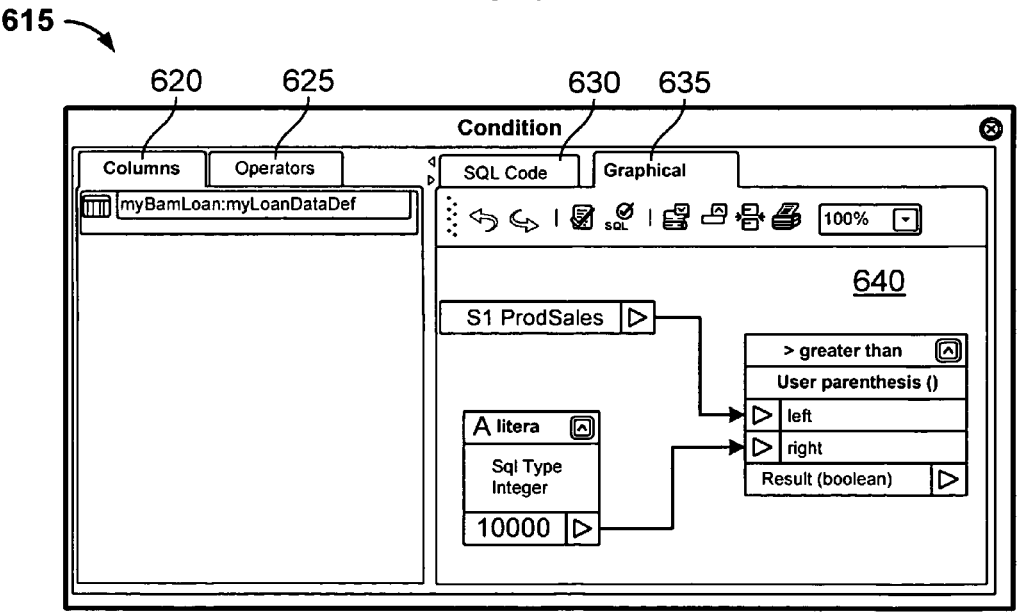
FIG. 6B is a GUI of a condition screen.

Zero or more conditions are set on the fields in the data definition to create the condition alert. An alert condition editor can be used to create a query to detect when a condition has occurred, such as a particular data element exceeding a threshold. Referring to FIGS. 6A and 6B, a GUI of an alert condition editor 600 has a canvas 602 for selecting a desired data definition 605 and assigning conditions 610 to the data definition 605. In some implementations, a condition editor 615 is provided to allow the user to select a condition to be applied to a data element. The condition editor 615 can allow a user to construct filters that constitute a condition on the data definition. In some implementations the condition editor 615 allows a user to enter a native SQL command in text form. In some implementations, the condition editor 615 includes graphical means for entering SQL commands.

In some implementations, the condition editor 615 includes tabs 620, 625, 630, 635, so that the user can toggle between different portions of the editor. Further, in one implementation, two of the tabs are for tree listings, here columns and operators, and two of the tabs are for user modes, here SQL code and graphical. A columns tab 620 lists the data elements by name in the data definition. When the columns tab 620 is selected, a data element can be selected and added to a canvas, such as canvas 640, which is displayed when a graphical tab 635 is selected, or a canvas that is displayed with a SQL code tab 630 is selected. Operations can then be specified for each element on the canvas 640. When an operations tab 625 is selected, SQL operations are listed. The SQL operations can be dragged onto the canvas 640 and associated with a data element that is on the canvas 602. The operations on the data element determine whether a specified condition has occurred. As referred to herein, the operations are performed on data, or values retrieved for each data element.

A SQL code tab 630 provides the user with a location to enter native SQL commands or place data elements or operators from under the columns tab 620 or the operators tab 625, respectively. A graphical tab 635 allows a user to create conditions by selecting elements and operators from under the column tab 620 and operator tab 625, respectively, and placing them on a canvas 640. The canvas 640 provides a location for the user to place the elements and the conditions that are applied to the elements. A user can toggle between a SQL code view and a view of a graphical representations of the operators and data elements, such as by selecting the tabs 630 or 635.

Referring to FIG. 6C, the SQL code tab 630 can include a tool palette, which includes a validation icon 645. When the validation icon 645 is selected, the syntactical validity of the SQL code listing can be checked and success or errors that are discovered can be reported to the user. In some implementations, the alert does not need to be completed before the validity is checked. Referring to FIG. 6D, the graphical tab 635 can include a palette with tools, such as undo 650, redo 655, validate 660, show SQL for condition 665, expand all graph 670, collapse all graph 670, autolayout all graph 680 and print graph 685 icons. The back 650 and forward 655 icons navigate back and forward through a sequence of modifications made on the graphical canvas 640. A validate icon 660 checks the syntactical validity of a graph and reports and errors or successes. A show SQL for condition icon 665 tries to validate a graph and, if successful, displays the corresponding SQL statement for the entire condition. An expand all graph icon 670 provides more detail, such as by showing all input to and output from all fields in all operators on the canvas. A collapse all graph icon 670 provides more screen space by minimizing all operators, showing only connections to and from the operators. An autolayout all graph icon 680 disentangles crossed connections and overlaps and creates left-to-right flow of input to output. A print group icon 685 allows a user to print a graph, using various scaling options. In some implementations, when an operator has been applied to an element, an indication, such as a filter icon (see icon 750 in FIG. 9, below), can appear adjacent to the data element that is being monitored. When the operator is applied to the data associated with the data element, whether a condition has occurred can be determined. For example, if the operator is as simple as determining when data associated with one data element is equal to a predetermined value, such as when a customer name is equal to SeeBeyond Valued Customer 1, the condition can be determined to be met.

Figure 7:
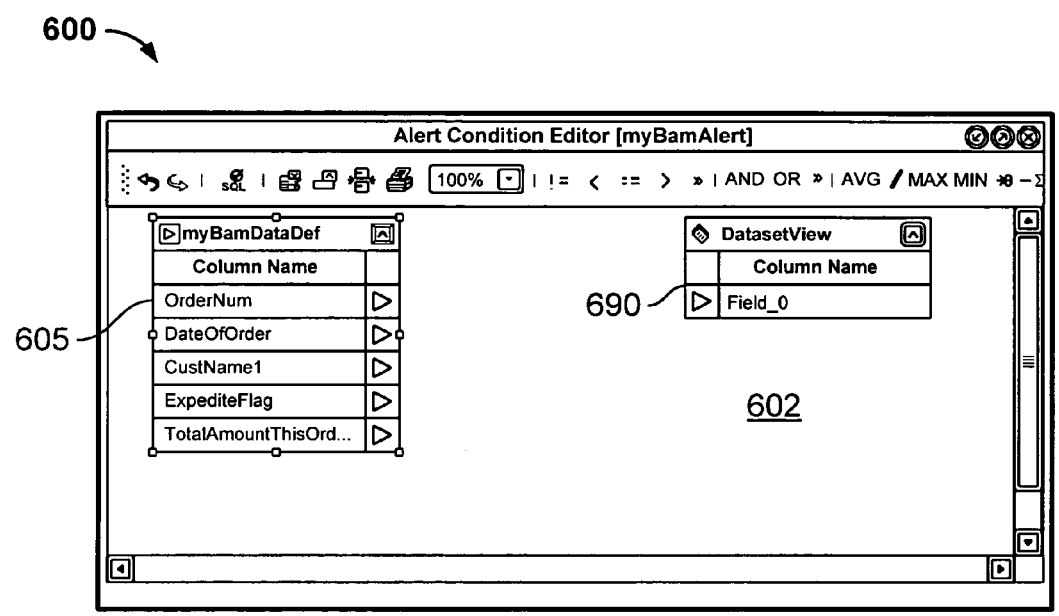
FIG. 7 is a GUI of a display for setting a condition.
Figure 8:
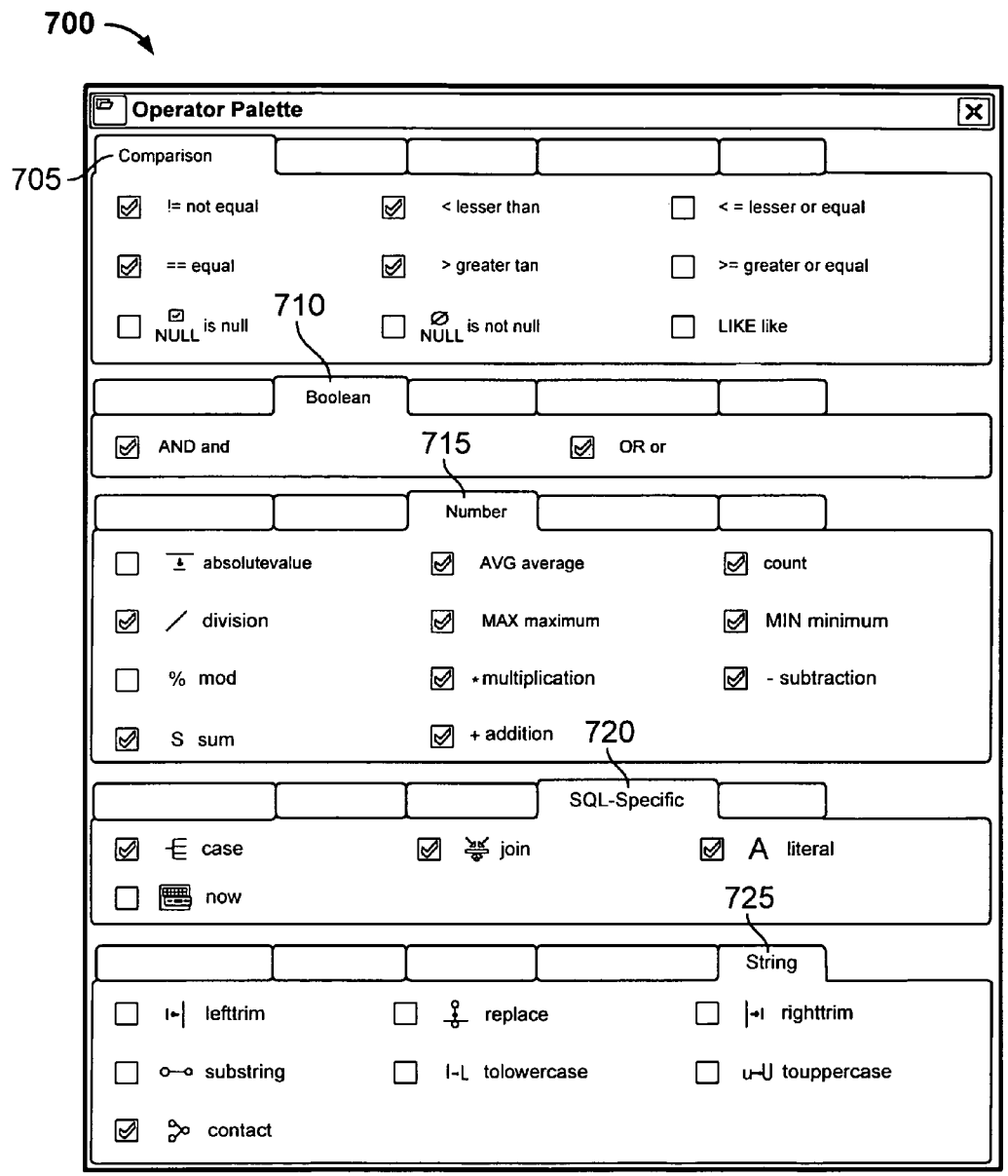
FIG. 8 is a GUI of an operator palette.
Figure 9:
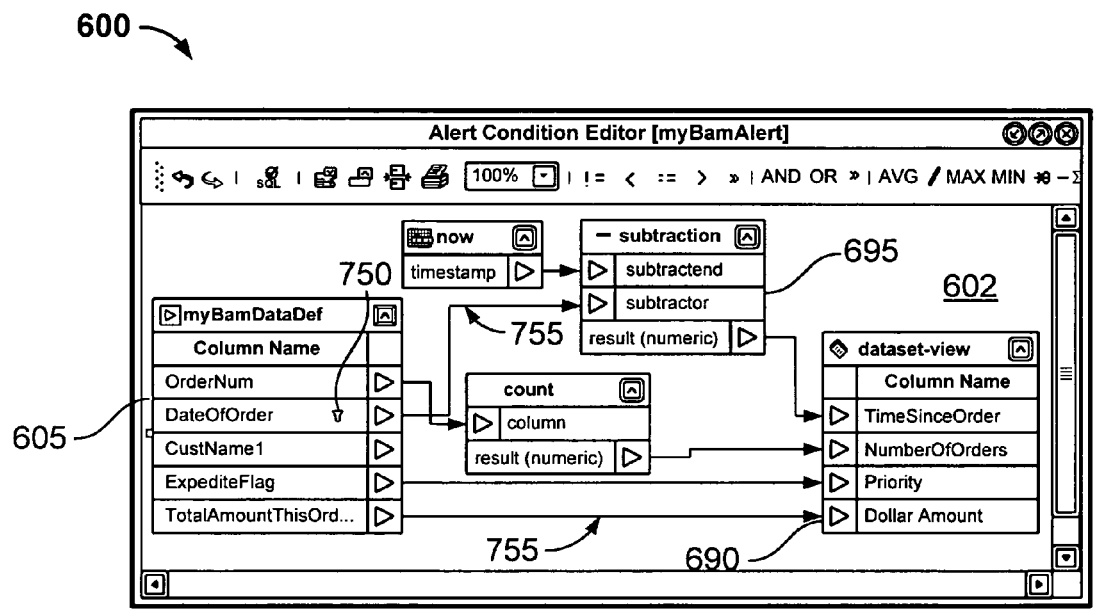
FIG. 9 is a GUI of a data definition mapped to operators and a data set view.

Referring to FIG. 7, a GUI of the alert condition editor 600 displays the data definition 605 and a data set view 690. The data set view 690 determines what information will be communicated in the alert. The data set view 690 includes one or more fields. Each field in the data set view 690 is mapped from a field, or element, in the data definition and associated operators. To configure the data set view 690, operators can be selected from an operator palette 700 (see FIG. 8) and applied to the canvas 602, such as between the data definition 605 and the data set view 690. Referring to FIG. 9, the alert condition editor 600 shows mapping 755 from fields from the data definition 605 through one or more operators 695 on the canvas 602, with the output ultimately going to a field of the data set view 690.

Referring back to FIG. 8, the operator palette 700 can include multiple tabs 705, 710, 715, 720 and 725, under which the operators are organized. A comparison tab 705 can include operators, such as comparisons, no equal, equal, lesser than, greater than, lesser or equal, greater or equal, null, not null and like. A Boolean tab 710 can include Boolean operators, such as "and" and "or". A number tab 715 can include operations to be performed on values, such as absolute value, division, modulus, sum, average, maximum, multiplication, addition, count, minimum and subtraction. A SQL specific tab 720 can include operators, such as case, now, join and literal. A string tab 725 can include left trim, right trim, replace, substring, to lower case, to upper case and concatenate. Other operators as known to those of skill in the art can also be included on the operator palette 700.

In some implementations, a property setting for the alert can then be created or modified. The property setting can define how and when the alert occurs. For example, the alert can be in the form of an electronic message in the property setting, including an e-mail address associated with the alert. The properties can also define how frequently the alert is sent. Further, the properties can indicate how frequently the conditions are determined. As noted herein, the data set view determines what is included in the alert. The operators that are applied to the data elements through the condition editor 615 determine whether an alert will be sent, while the operators that are mapped to the data set view determine the information included in the alert. Thus, the condition that sets off the alert is independent of output that is communicated to the user. In some implementations, the application can be arranged such that the condition that sets off an alert is not one of the outputs that is included in the alert.

Figure 10:
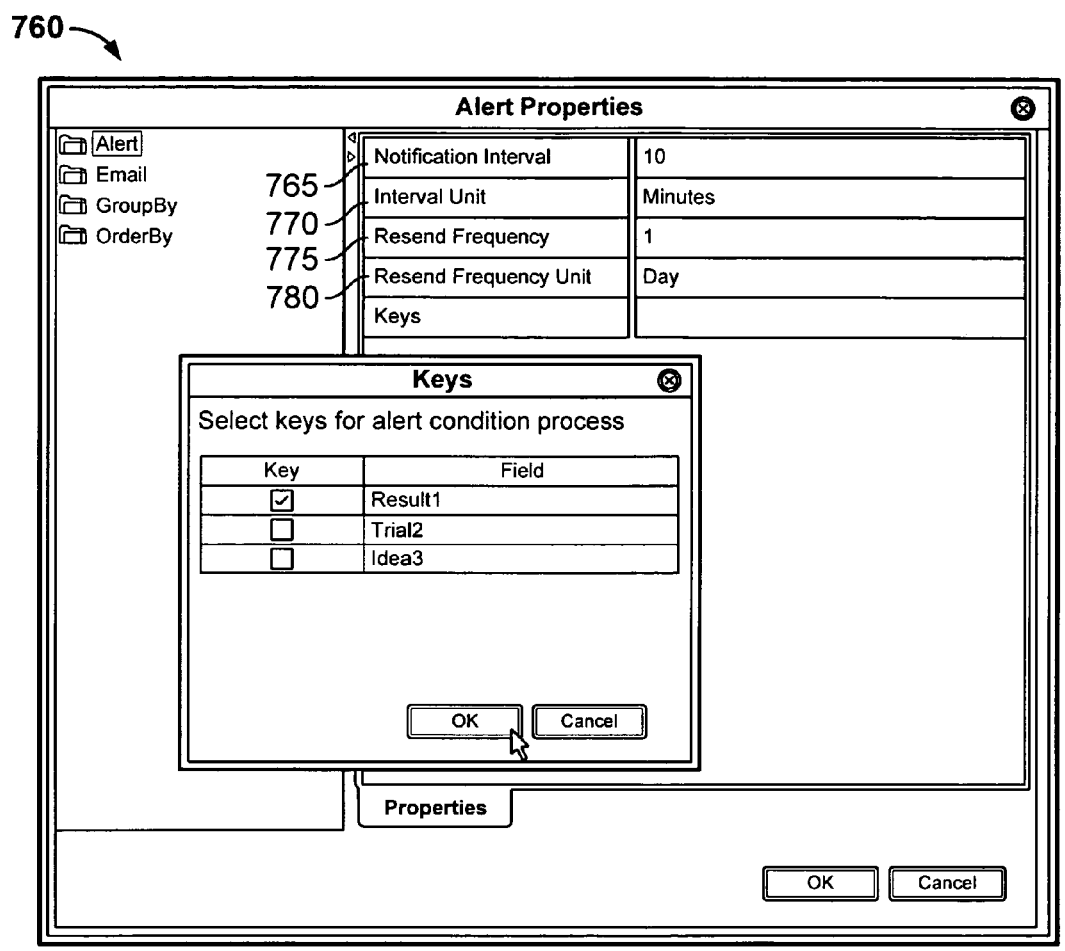
FIG. 10 is a GUI of a screen for setting up an alert.

Referring to FIG. 10, in one implementation, an alert properties dialog 760 can be provided for entering the alert properties. The alert properties dialog 760 include a notification interval 765, an interval unit 770, a resend frequency 775 and a resend frequency unit 780. The user can select one or more of these fields to complete or modify the alert.

Figure 11:
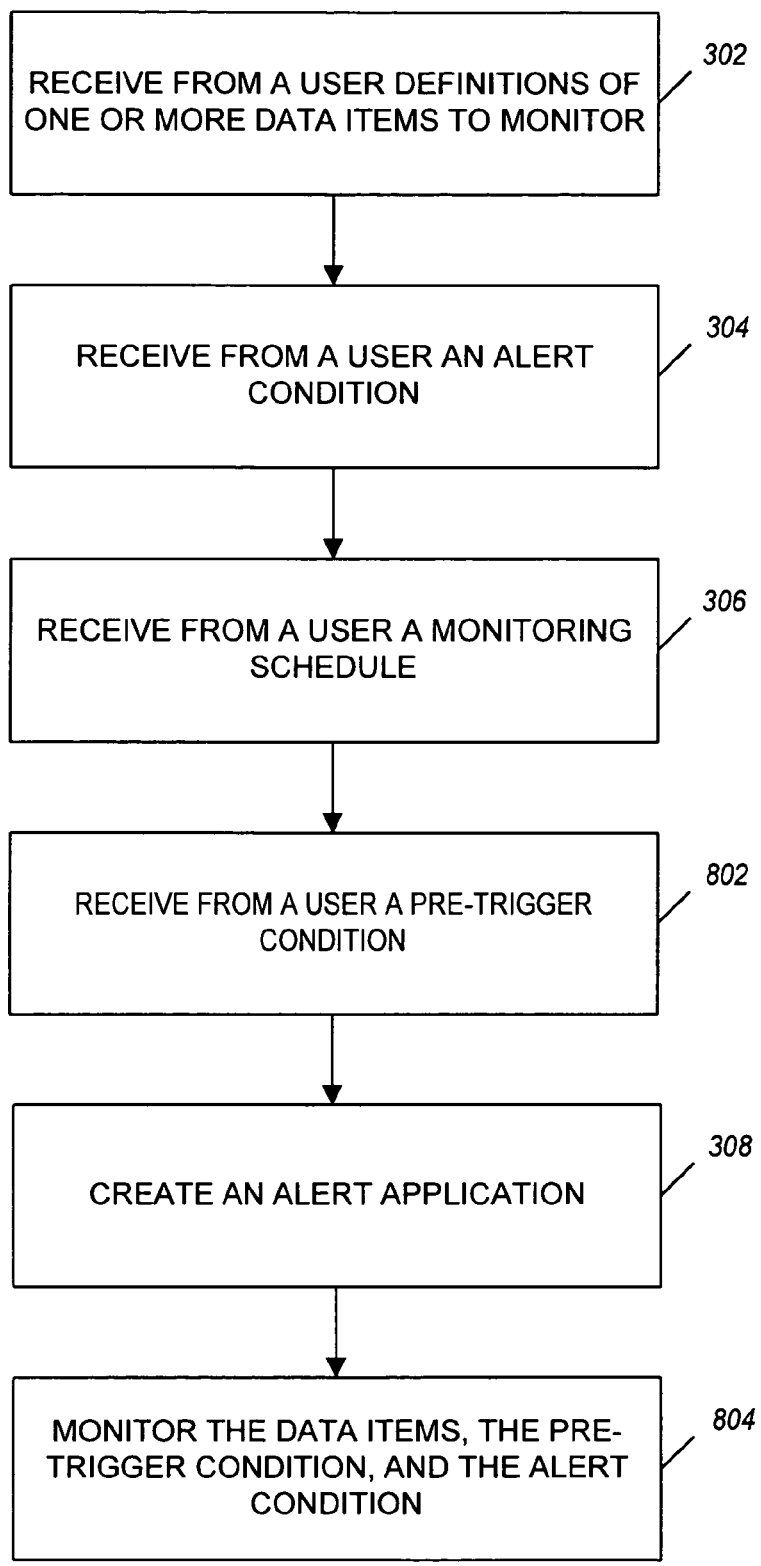
FIG. 11 is a flow diagram for monitoring conditions.

Referring to FIG. 11, in one implementation, after the business activity monitor engine 106 receives, e.g., from a user, definitions of one or more data elements to monitor (step 302) and a set of one or more alert conditions (step 304), receive a monitoring schedule (step 306) and create an alert application, as described in reference to FIG. 3, the business activity monitor engine 106 can receive, e.g., from the user, a set of one or more pre-trigger conditions (step 802). A pre-trigger condition specifies a state of monitored data elements that can lead to an alert condition. A state of monitored data elements that can lead to an alert condition is not necessarily the same as a state of monitored data elements that can lead to an alert. Therefore, by monitoring pre-trigger conditions, a user can prevent alert conditions, thereby preventing an alert.

Similarly to an alert condition, a pre-trigger condition can be defined by a user to include actions for an alert application to take if the pre-trigger condition is met. For example, a user can define a pre-trigger condition to include corrective steps that an alert application needs to perform in order to prevent an alert condition.

Once the business activity monitoring engine 106 receives, e.g., from a user, definitions of one or more data elements to monitor, a set of one or more alert conditions, and a set of one or more pre-trigger conditions, the business activity monitoring engine 106 can create an alert application to monitor data elements, alert conditions, and pre-trigger conditions specified by the user (step 804). Since pre-trigger conditions can lead to alert conditions, monitoring pre-trigger conditions in addition to alert conditions (and taking corrective action if pre-trigger conditions are met) can thwart alert conditions, thereby preventing alerts.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back end component (e.g., a data server), a middleware component (e.g., an application server), or a front end component (e.g., a client computer having a graphical user interface or a Web browser through which a user can interact with an implementation of the invention), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Although SQL code has been described as the code that is represented by GUI components, other database accessing languages could alternatively be the basis for one or more of the components. Other embodiments are within the scope of the following claims.

What is claimed is:

1. A computer implemented method, comprising:
    generating a graphical user interface (GUI) comprising a canvas;
    receiving, via the GUI, input from a user to graphically add to the canvas a plurality of data elements to be monitored, wherein the plurality of data elements correspond to a plurality of values that are altered dynamically during execution of an alert application;
    receiving, via the GUI, input from the user to graphically add at least one operator to the canvas and to associate the at least one operator with the plurality of data elements, wherein the at least one operator operates on the plurality of data elements to produce a set of results, and wherein the at least one operator comprises SQL code for performing one or more relational database querying operations;
    receiving, via the GUI, input from the user to add to the canvas at least one alert condition to be applied to the set of results, wherein the user provides a monitoring schedule associated with each alert condition indicating how often each alert condition is checked;
    receiving, via the GUI, input from the user comprising a pre-trigger condition and corrective steps, wherein the pre-trigger condition specifies a threshold value of at least one of the plurality of data elements; and
    automatically generating, using the plurality of data elements, the at least one operator, the at least one alert condition, and the pre-trigger condition on the canvas, the alert application which, when executed, is configured to:
        monitor the data elements to identify the pre-trigger condition,
        when the pre-trigger condition is satisfied, deploy the corrective steps, wherein deployment of the corrective steps prevents the data elements from producing a potential result satisfying the at least one alert condition, and when the pre-trigger condition is not satisfied:
operate on the data elements to produce the set of results, determine whether the set of results satisfies the at least one alert condition, and
trigger the alert to be sent to the user when the at least one alert condition is satisfied by the set of results.

2. The method of claim 1, wherein the method further comprises:
prior to automatically generating the alert application, receiving from the user, via the GUI, input specifying what action or actions are to be performed when the alert is triggered; and
wherein the alert application is automatically generated further based upon the input specifying what action or actions are to be performed such that the alert application performs such action or actions when the alert is triggered.

3. The method of claim 1, wherein the method further comprises:
prior to automatically generating the alert application, receiving from the user, via the GUI, input specifying what information set is to be included with the alert; and
wherein the alert application is automatically generated further based upon the input specifying what information set is to be included with an alert such that the alert application includes such information set with the alert.

4. The method of claim 1, wherein the method further comprises:
prior to automatically generating the alert application, receiving from the user, via the GUI, input specifying one of an alert interval or an alert resend frequency; and
wherein the alert application is automatically generated further based upon the input specifying the alert interval or the alert resend frequency such that the alert application behaves in accordance with the alert interval or the alert resend frequency.

5. A machine readable storage device having stored thereon instructions, which when executed by a computer, cause the computer to perform the operations of:
generating a graphical user interface (GUI) that includes a canvas;
receiving, via the GUI, input from a user to graphically add to the canvas a plurality of data elements to be monitored, wherein the plurality of data elements correspond to a plurality of values that are altered dynamically during execution of an alert application;
receiving, via the GUI, input from the user to graphically add at least one operator to the canvas and to associate the at least one operator with the plurality of data elements to indicate that the at least one operator operate on the plurality of data elements to produce a set of results, and wherein the at least one operator comprises SQL code for performing one or more relational database querying operations;
receiving, via the GUI, input from the user to add to the canvas at least one alert condition to be applied to the set of results, wherein the user provides a monitoring schedule associated with each alert condition indicating how often each alert condition is checked;
receiving, via the GUI, input from the user comprising a pre-trigger condition and corrective steps, wherein the pre-trigger condition specifies a threshold value of at least one of the plurality of data elements; and
automatically generating, using the plurality of data elements, the at least one operator, the at least one alert condition, and the pre-trigger condition on the canvas, the alert application which, when executed, is configured to:
monitor the data elements to identify the pre-trigger condition.
when the pre-trigger condition is satisfied, deploy the corrective steps, wherein deployment of the corrective steps prevents the data elements from producing a potential result satisfying the at least one alert condition, and
when the pre-trigger condition is not satisfied:
operate on the data elements to produce the set of results,
determine whether the set of results satisfies the at least one alert condition, and
trigger the alert to be sent to the user when the at least one alert condition is satisfied by the set of results.

6. The machine readable storage device of claim 5, wherein the instructions cause the computer to further perform the operation of:
prior to automatically generating the alert application, receiving from the user, via the GUI, input specifying what action or actions are to be performed when the alert is triggered; and
wherein the alert application is automatically generated further based upon the input specifying what action or actions are to be performed such that the alert application performs such action or actions when the alert is triggered.

7. The machine readable storage device of claim 5, wherein the instructions cause the computer to further perform the operation of:
prior to automatically generating the alert application, receiving from the user, via the GUI, input specifying what information set is to be included with the alert; and
wherein the alert application is automatically generated further based upon the input specifying what information set is to be included with an alert such that the alert application includes such information set with the alert.

8. The machine readable storage device of claim 5, wherein the instructions cause the computer to further perform the operation of:
prior to automatically generating the alert application, receiving from the user, via the GUI, input specifying one of an alert interval or an alert resend frequency; and
wherein the alert application is automatically generated further based upon the input specifying the alert interval or the alert resend frequency such that the alert application behaves in accordance with the alert interval or the alert resend frequency.

9. A system comprising a processor configured to perform the operations of:
generating a graphical user interface (GUI) comprising a canvas;
receiving, via the GUI, input from a user to graphically add to a canvas a plurality of data elements to be monitored, wherein the plurality of data elements correspond to a plurality of values that are altered dynamically during execution of an alert application;
receiving, via the GUI, input from the user to graphically add at least one operator to the canvas and to associate the at least one operator with the plurality of data elements, wherein the at least one operator operates on the plurality of data elements to produce a set of results, and wherein the at least one operator comprises SQL code for performing one or more relational database querying operations;

receiving, via the GUI, input from the user to add to the canvas at least one alert condition to be applied to the set of results, wherein the user provides a monitoring schedule associated with each alert condition indicating how often each alert condition is checked;

receiving, via the GUI, input from the user comprising a pre-trigger condition and corrective steps, wherein the pre-trigger condition specifies a threshold value of at least one of the plurality of data elements; and automatically generating, using the plurality of data elements, the at least one operator, the at least one alert condition, and the pre-trigger condition on the canvas, the alert application which, when executed, is configured to:

monitor the data elements to identify the pre-trigger condition, when the pre-trigger condition is satisfied, deploy the corrective steps, wherein deployment of the corrective steps prevents the data elements from producing a potential result satisfying the at least one alert condition, and when the pre-trigger condition is not satisfied:
operate on the data elements to produce the set of results,
determine whether the set of results satisfies the at least one alert condition, and
trigger the alert to be sent to the user when the at least one alert condition is satisfied by the set of results.

10. A computer implemented method, comprising:
generating a graphical user interface (GUI) comprising a canvas;
receiving, via the GUI, input from a user to graphically add to a canvas a plurality of data elements to be monitored, wherein the plurality of data elements correspond to a plurality of values that are altered dynamically;
receiving, via the GUI, input from the user to graphically add at least one operator to the canvas and to associate the at least one operator with the plurality of data elements, wherein the at least one operator operates on the plurality of data elements to produce a set of results, and wherein the at least one operator comprises SQL code for performing one or more relational database querying operations;
receiving, via the GUI, input from the user to add to the canvas at least one alert condition to be applied to the set of results, wherein the user provides a monitoring schedule associated with each alert condition indicating how often each alert condition is checked;
receiving, via the GUI, input from the user comprising a pre-trigger condition and corrective steps, wherein the pre-trigger condition specifies a threshold value of at least one of the plurality of data elements;
monitoring the data elements to identify the pre-trigger condition;
when the pre-trigger condition is satisfied, deploying the corrective steps, wherein deployment of the corrective steps prevents the data elements from producing a potential result satisfying the at least one alert condition, and
when the pre-trigger condition is not satisfied:
monitoring and operating on the plurality of data elements to produce the set of results;
determining whether the set of results satisfies the at least one alert condition; and
triggering the alert, in response to a determination that the at least one alert condition is satisfied by the set of results.

11. The method of claim 10, wherein the method further comprises:
receiving from the user, via the GUI, input specifying what action to perform when the alert is triggered; and
performing the specified action when the alert is triggered.

12. The method of claim 10, wherein the method further comprises:
receiving from the user, via the GUI, input specifying what information set is to be included with the alert,
wherein triggering the alert comprises including such information set with the alert.

13. The method of claim 10, wherein the method further comprises:
receiving from the user, via the GUI, input specifying one of an alert interval or an alert resend frequency; and
wherein triggering the alert comprises behaving in accordance with the one of the alert interval or the alert resend frequency.

14. A machine readable storage device having stored thereon instructions which, when executed by a computer, cause the computer to perform the operations of:
generating a graphical user interface (GUI) comprising a canvas;
receiving, via the GUI, input from a user to graphically add to a canvas a plurality of data elements to be monitored, wherein the plurality of data elements correspond to a plurality of values that are altered dynamically;
receiving, via the GUI, input from the user to graphically add at least one operator to the canvas and to associate the at least one operator with the plurality of data elements, wherein the at least one operator operates on the plurality of data elements to produce a set of results, and wherein the at least one operator comprises SQL code for performing one or more relational database querying operations;
receiving, via the GUI, input from the user to add to the canvas at least one alert condition to be applied to the set of results, wherein the user provides a monitoring schedule associated with each alert condition indicating how often each alert condition is checked;
receiving, via the GUI, input from the user comprising a pre-trigger condition and corrective steps, wherein the pre-trigger condition specifies a threshold value of at least one of the plurality of data elements;
monitoring the data elements to identify the pre-trigger condition;
when the pre-trigger condition is satisfied, deploying the corrective steps, wherein deployment of the corrective steps prevents the data elements from producing a potential result satisfying the at least one alert condition, and
when the pre-trigger condition is not satisfied:
monitoring and operating on the plurality of data elements to produce the set of results;
determining whether the set of results satisfies the at least one alert condition; and
triggering the alert, in response to a determination that the at least one alert condition is satisfied by the set of results.

15. The machine readable storage device of claim 14, wherein the instructions cause the computer to further perform the operation of:
receiving from the user, via the GUI, input specifying what action or actions are to be performed when an alert is triggered;
wherein triggering one or more alerts comprises performing the specified action or actions.

16. The machine readable storage device of claim 14, wherein the instructions cause the computer to further perform the operation of:
- receiving from the user, via the GUI, input specifying what information set is to be included with the alert;
- wherein triggering one or more alerts comprises including such information set with an alert.

17. The machine readable storage device of claim 14, wherein the instructions cause the computer to further perform the operation of:
- receiving from the user, via the GUI, input specifying one of an alert interval or an alert resend frequency;
- wherein triggering the alert comprises behaving in accordance with the alert interval or the alert resend frequency.

18. A computer system comprising one or more processors configured to perform the operations of:
- generating a graphical user interface (GUI) comprising a canvas;
- receiving, via the GUI, input from a user to graphically add to a canvas a plurality of data elements to be monitored, wherein the plurality of data elements correspond to a plurality of values that are altered dynamically;
- receiving, via the GUI, input from the user to graphically add at least one operator to the canvas and to associate the at least one operator with the plurality of data elements, wherein the at least one operator operates on the plurality of data elements to produce a set of results, and wherein the at least one operator comprises SQL code for performing one or more relational database querying operations;
- receiving, via the GUI, input from the user to add to the canvas at least one alert condition to be applied to the set of results, wherein the user provides a monitoring schedule associated with each alert condition indicating how often each alert condition is checked;
- receiving, via the GUI, input from the user comprising a pre-trigger condition and corrective steps, wherein the pre-trigger condition specifies a threshold value of at least one of the plurality of data elements;
- monitoring the data elements to identify the pre-trigger condition;
- when the pre-trigger condition is satisfied, deploying the corrective steps, wherein deployment of the corrective steps prevents the data elements from producing a potential result satisfying the at least one alert condition, and
- when the pre-trigger condition is not satisfied:
  - monitoring and operating on the plurality of data elements to produce the set of results;
  - determining whether the set of results satisfies the at least one alert condition; and
  - triggering the alert, in response to a determination that the at least one alert condition is satisfied by the set of results.

* * * * *